(12) United States Patent
Pahisson et al.

(10) Patent No.: US 10,710,528 B2
(45) Date of Patent: Jul. 14, 2020

(54) BRACKET AND BRACKET ASSEMBLY

(71) Applicant: AUTOTUBE AKTIEBOLAG, Varbeg (SE)

(72) Inventors: Malin Pahisson, Varberg (SE); Jan Olofsson, Varberg (SE); Viktor Rosen, Kallered (SE)

(73) Assignee: AKWEL SWEDEN AB, Varberg (SE)

( * ) Notice: Subject to any disclaimer, the term of this patent is extended or adjusted under 35 U.S.C. 154(b) by 0 days.

(21) Appl. No.: 15/980,167

(22) Filed: May 15, 2018

(65) Prior Publication Data
US 2018/0326933 A1 Nov. 15, 2018

(30) Foreign Application Priority Data

May 15, 2017 (FR) ...................................... 17 54254

(51) Int. Cl.
| | | |
|---|---|---|
| *B60R 16/08* | (2006.01) | |
| *B21D 7/06* | (2006.01) | |
| *B60R 16/02* | (2006.01) | |
| *F16L 55/035* | (2006.01) | |
| *F16L 3/123* | (2006.01) | |

(52) U.S. Cl.
CPC ............... *B60R 16/08* (2013.01); *B21D 7/06* (2013.01); *B60R 16/0215* (2013.01); *F16L 55/035* (2013.01); *F16L 3/1233* (2013.01)

(58) Field of Classification Search
CPC ....... B60R 16/08; B60R 16/0215; B61D 7/06; F16L 55/035; F16L 3/1233; F16L 3/12; F16L 3/2235; F16L 3/1075; F16L 7/00; F16L 3/223

USPC ......................................................... 248/74.3
See application file for complete search history.

(56) References Cited

U.S. PATENT DOCUMENTS

| | | | |
|---|---|---|---|
| 5,009,376 A | 4/1991 | Usui | |
| 8,439,317 B2 * | 5/2013 | Sampson | .............. F16L 3/1083 248/63 |
| 9,243,723 B2 * | 1/2016 | DeCesare | ............... F16L 3/123 |
| 2007/0257161 A1 * | 11/2007 | Geppert | .................... F16L 3/12 248/74.3 |
| 2010/0243855 A1 * | 9/2010 | Sampson | .............. F16L 55/035 248/534 |
| 2014/0299722 A1 * | 10/2014 | Sampson | .............. F16L 55/035 248/74.2 |

FOREIGN PATENT DOCUMENTS

GB 2 231 635 A 11/1990

\* cited by examiner

*Primary Examiner* — Christopher Garft
(74) *Attorney, Agent, or Firm* — Oliff PLC

(57) ABSTRACT

A bracket intended to be fastened to a support, such as a chassis or an engine of a vehicle, preferably a motor vehicle, the bracket having at least a body including: a first end configured to be fastened to a support, a second end opposite to the first end, an intermediate portion arranged between the first end and the second end, the second end being bent so as to form a recess oriented toward the first end and facing the intermediate portion, wherein the bracket further includes an elastic insert arranged in the recess of the second end.

10 Claims, 3 Drawing Sheets

BRACKET AND BRACKET ASSEMBLY

Figure 1:
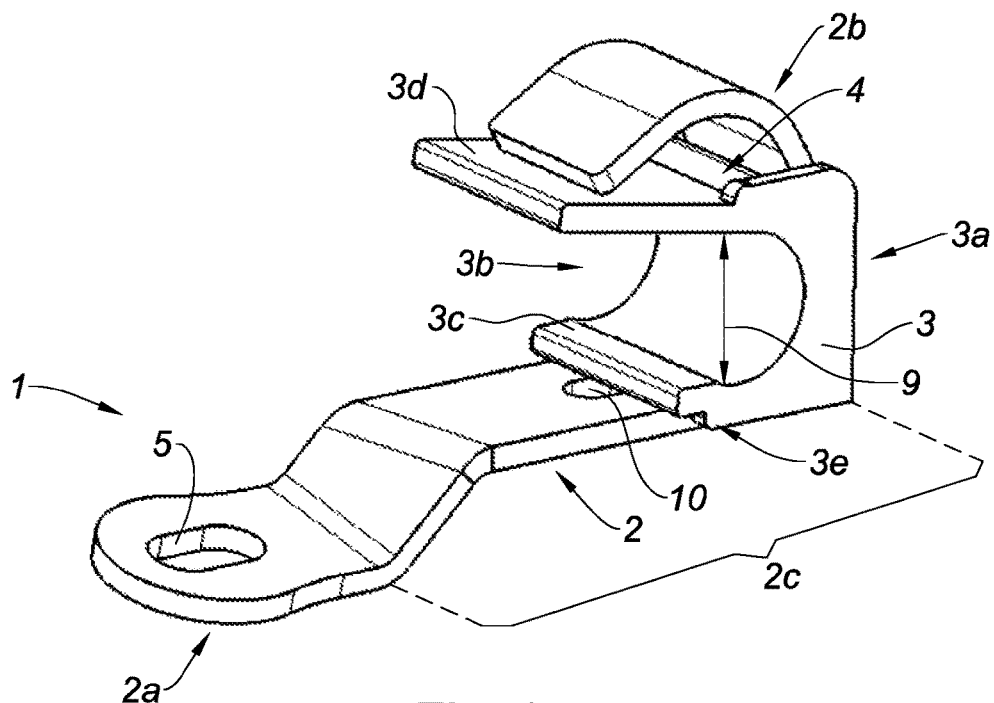

The invention relates to a bracket, a bracket assembly comprising at least a bracket and a tubing element, and a manufacturing process for making said bracket assembly.

Bracket assemblies are widely used for fixing tubing elements, such as pipes, to various supports. A well-known example of use consists in fixing a pipe to an engine or a chassis in a vehicle. Usually, a bracket assembly comprises on the one hand a tubing element, including at least a pipe portion surrounded by an elastomeric sleeve, and on the other hand a bracket made of a metal strip, which surrounds and grips the tubing element.

Gripping the tubing element within the bracket is usually achieved by forming the bracket into a curved U-shape so as to create a substantially cylindrical recess located between two emerging branches, and then spreading said branches for inserting the tubing element in the recess, and finally pressing and securing the branches one against the other, with additional fixation means such as a screw, a rivet, a folded tab, a welding bead or the like, so as to firmly clamp the tubing subset within the recess.

However, since additional fixation means are requested, the resulting bracket assemblies may disadvantageously be relatively costly and heavy. In addition, the manufacturing process involves some restrictions in the bracket design, and is generally not suitable for full automation.

The invention consequently aims at remedying the above-mentioned drawbacks, and providing a new bracket with a simplified design, suitable for automation, and a new manufacturing process for making a bracket assembly at lower cost.

For this purpose, the object of the invention is a bracket having at least a body comprising:
- a first end configured to be fastened to a support, a second end opposite to the first end,
- an intermediate portion arranged between the first end and the second end,
- the second end being bent so as to form a recess oriented toward the first end and facing the intermediate portion, characterized in that the bracket further comprises an elastic insert arranged in the recess of the second end.

The bracket according to the invention allows to have a firmly fixation around a tubing element thanks to the elastic insert that prevents loose fit of the tubing element. Moreover, the configuration of said bracket with an already bent second end and the elastic insert allows a simplification of the manufacturing process of the bracket assembly and a better positioning of the bracket on the tubing element.

According to a feature of the invention, the bracket is configured to be closed around a tubing element by a forming tool so as to form a bracket assembly.

According to another feature of the invention, the recess of the second end corresponds to a bending position for the final closing on a pipe or tube. Preferentially, the recess is curved.

According to another feature of the invention, the body of the bracket is metallic.

According to another feature of the invention, the first end is configured to be fastened to a support, such as a chassis or an engine of a vehicle, preferably a motor vehicle.

According to another feature of the invention, the first end comprises one or more fastening interfaces, such as fastening holes and/or fastening welded studs, etc.

According to another feature of the invention, the second end comprises at least one retaining opening cooperating with a retaining tab arranged on the elastic insert.

According to another feature of the invention, the second end comprises a positioning opening configured to define a bending position for final closing of the bracket. Advantageously, the positioning opening is arranged nearby the retaining opening.

According to another feature of the invention, the bracket is shaped so as to fit in a forming tool and to stop the forming to at a determined position which corresponds to the closing of the bracket. This shape of the bracket prevents the crushing of the elastic insert during the closing of the bracket.

According to another feature of the invention, the elastic insert, comprises a first portion forming a housing configured to house a part of the second end. Advantageously, the housing of the first portion is shaped to be adapted to the part of the second end.

According to another feature of the invention, the elastic insert comprises at least one second portion opposite to the first portion.

According to another feature of the invention, the second portion is forming a securing gap. Preferentially, the second portion is shaped like a curve According to another feature of the invention, the second portion comprises a first branch and a second branch arranged opposite to the first branch, the first branch and the second branch being arranged to frame the curve formed by the second portion of the elastic insert.

According to another feature of the invention, the first branch is arranged so as to be in contact with a part of the intermediate portion of the bracket's body.

According to another feature of the invention, the second branch is, longer than the first branch. Advantageously, the second branch forms a lid intended to be arranged around the tubing element when the bracket assembly is realized.

According to another feature of the invention, the second branch is arranged relative to the intermediate portion of the bracket's body in order to allow the introduction of a tubing element. Preferentially, the second branch forms an angle with the intermediate portion of the bracket's body or the second branch is extending globally parallel relative to the intermediate portion.

According to another feature of the invention, the first branch and/or the second branch are flat before deformation. The first branch and/or the second branch are not curved and do not extend the curve of the second portion.

According to another feature of the invention, the first branch extends substantially parallel to the second branch before deformation.

According to another feature of the invention, the second branch is arranged under the second end's bending and being overlapping said second end.

Advantageously, the second portion of the elastic insert is configured to surrounds a pipe or tube when the bracket is closed forming a bracket assembly, the second branch being bent with the second end of the bracket's body.

According to another feature of the invention, the second branch bent is extending substantially in a secant and preferably perpendicular manner relative to the intermediate portion and/or to the first branch.

According to another feature of the invention, the elastic insert comprises a retaining tab intended to cooperate with a retaining opening arranged on the second end of the body of the bracket. Advantageously, the retaining tab goes through the retaining opening of the second end of the body and is shaped to be retained on the back surface of the second end of the body. The retaining tab improves and secures the assembly of the elastic insert with the bracket's body.

According to another feature of the invention, the retaining tab is shaped like a cone or with or without barb or bulge to hook firmly on to the bracket's external surface.

According to another feature of the invention, the retaining tab is positioned on the first portion of the elastic insert in a non-centered way or non symmetrical way to prevent the wrong positioning of the elastic insert on the bracket's body.

According to another feature of the invention, the elastic insert is an elastomeric insert and more particularly a rubber insert.

Advantageously, the elastic insert is intended to take up tolerance between the tubing element in the bracket assembly and the bracket and also provides vibration damping.

According to another feature of the invention, the second portion of the elastic insert comprises a bottom housing shaped to house a part of the intermediate portion of the bracket's body.

According to another feature of the invention, the bracket comprises at least one additional hole configured to cooperate with a pin or a mechanical device arranged in a forming tool. The additional hole allows securing and holding firmly at least the bracket and preferably the bracket assembly to the tool during the manufacturing of said bracket assembly. Preferably, the additional hole is oval. Advantageously, the additional hole is arranged on the body of the bracket and more particularly on the intermediate portion of the body.

The invention relates also to a bracket assembly comprising a bracket according to the invention and at least one tubing element.

Advantageously, the bracket assembly is used for fixing in the vehicle a tubing element that constitutes a part of a fluid circuit, such as a cooling circuit, a braking circuit, a power-assisting circuit for a steering mechanism, a fuel supply circuit, an air supply circuit, a windscreen-washing circuit, etc.

According to another feature of the invention, the tubing element is housed in the securing gap formed by the second portion of the elastic insert.

According to another feature of the invention, the elastic insert surrounds the tubing element. According to another feature of the invention, the second end of the bracket's body grips the surrounding of the elastic insert so as to close the housing where the tubing element is housed. This configuration allows preventing any unintentional removal of said tubing element from said bracket, or any relative displacement of said tubing element in rotation and translation, without it being necessary to further tighten the bracket into a closed loop around the tubing element by additional fixation means such as screws or rivets (typically in joining the second end and the intermediate portion of the bracket together by means of such additional fixation means). The resulting bracket assembly, which is obtained from a reduced set of simplified constituting parts, is thus of lighter and simpler design than the previously known assemblies.

Advantageously, the invention makes it possible to produce a bracket and tubing assembly wherein the bracket is sufficiently bent plastically against the tubing element for firmly holding said tubing element, and more particularly the tubing element, by means of the sole, intrinsic rigidity of said bracket. In addition, securing the tubing element within the bracket by suitably forming the bracket's second end only requires simple bending operations, which can all be performed within a same forming tool, with no additional fixation means. Consequently, the manufacturing process according to the invention can be easily automated, and can thus achieve a high yield at low costs.

Moreover, the remaining spring back in the elastic insert on the tubing element and in the bracket is holding the tubing element firmly by the folded second end of the bracket's body.

According to another feature of the invention, the tubing element may be any kind of part, or combination of parts, of any shape or section (e.g. circular, rectangular, square . . . ), which are intended to be fastened to a receiving support, such as a chassis or an engine of a vehicle, via the bracket.

According to another feature of the invention, the tubing element may comprise a massive bar or a plurality of massive bars.

According to another feature of the invention, the tubing element may preferably also comprise, or be constituted of, a hollow part, or a plurality of hollow parts, such as a tube or pipe element, or a plurality of tube or pipe elements.

According to another feature of the invention, the tubing element may be a rigid pipe of a flexible hose, and can be made of any suitable material, such as plastic or metal. Possibly, the tubing element may comprise a plurality of juxtaposed tubes or pipes, e.g. arranged in parallel one to the other. More globally, the tubing element may be a combination of one of more tubes or pipes with one or more massive parts such as bar sections.

Advantageously, the elastic insert has a Young modulus lower than the Young modulus of the tubing element The invention relates also to a manufacturing process for making a bracket assembly, said process comprising at least the following steps:
(a) Obtaining the bracket according to the invention,
(b) Placing the bracket within a forming tool,
(c) Placing a tubing element within the bracket, in the securing gap arranged in the elastic insert,
(d) Actuating the forming tool for plastically deforming the bracket by linear or rotational movement so as to close the bent of the second end of the bracket around the tubing element and to grip the tubing element, the elastic insert being simultaneously bent with the second end of the bracket's body in order to surround the tubing element.

The simple closing at step (d) allows for easy automation of the assembly operation on to the tubing element. Moreover, the simplicity of the closing and the absence of additional closing tabs, screws, rivets or other locking devises allow for more complex shape of the rest of the bracket.

According to another feature of the invention, the manufacturing process of the invention is particularly suitable for fastening fragile hollow elements, such as tubing elements, which are possibly more subject to crushing than massive (full) parts.

According to another feature of the invention, the closing of the bent of the second end of the bracket's body, lead to the bending of a portion of the elastic insert and more particularly, a second branch of the portion, so that the portion of the elastic insert surrounds the tubing element.

According to another feature of the invention, the step (c) can be executed by hand or by a robot.

According to another feature of the invention, the forming tool used to close the bracket around the tubing element is a U-shaped tool.

According to another feature of the invention, the step (a) comprises sub-steps consisting of:
- pre-bend the second end of the body of the bracket,
- pre-assemble the elastic insert on the body of the bracket, by inserting the retaining tab of the elastic insert in the retaining opening of the second end of the bracket's body.

Thus, the bracket as obtained is in an open position in order to receive a tubing element and the elastic insert is configured to take up tolerance between the tubing element and the bracket and also to provide vibration damping.

Advantageously, the second end of the bracket's body is prevented from crushing the elastic insert by having a length designed so that the closing stops on top of the intermediate portion of the bracket's body. Alternately, the forming tool can be designed so that it stops on top of the second end of the bracket or a stop can be arranged on the bracket in similar position preventing the forming tool from further movement and crushing the elastic insert.

Moreover, the elastic insert can advantageously accommodate, by elastic compression, the major part of the thickness shrinkage of the tubing element within the securing gap of the second portion, in particular in the forced securing gap, thus limiting the compression stresses in the tubing element, notably during the step (c) of plastically deforming the bracket against the said tubing element.

According to another feature of the invention, the pre-assemble sub-step of step (a) can be a manual assembly or a mechanical assembly or an overmolding of the insert on the bracket's body.

According to another feature of the invention, the manufacturing process comprises a sub-step to step (b) which consists of securing the bracket on the forming tool, by hooking the positioning opening of the intermediate portion of the bracket on the forming tool. Thus, are avoided uncontrolled displacements or losses of the processed parts, and time waste.

Advantageously, the process thus achieves a reliable and stable fixation of the tubing element in the bracket.

Figure 2:
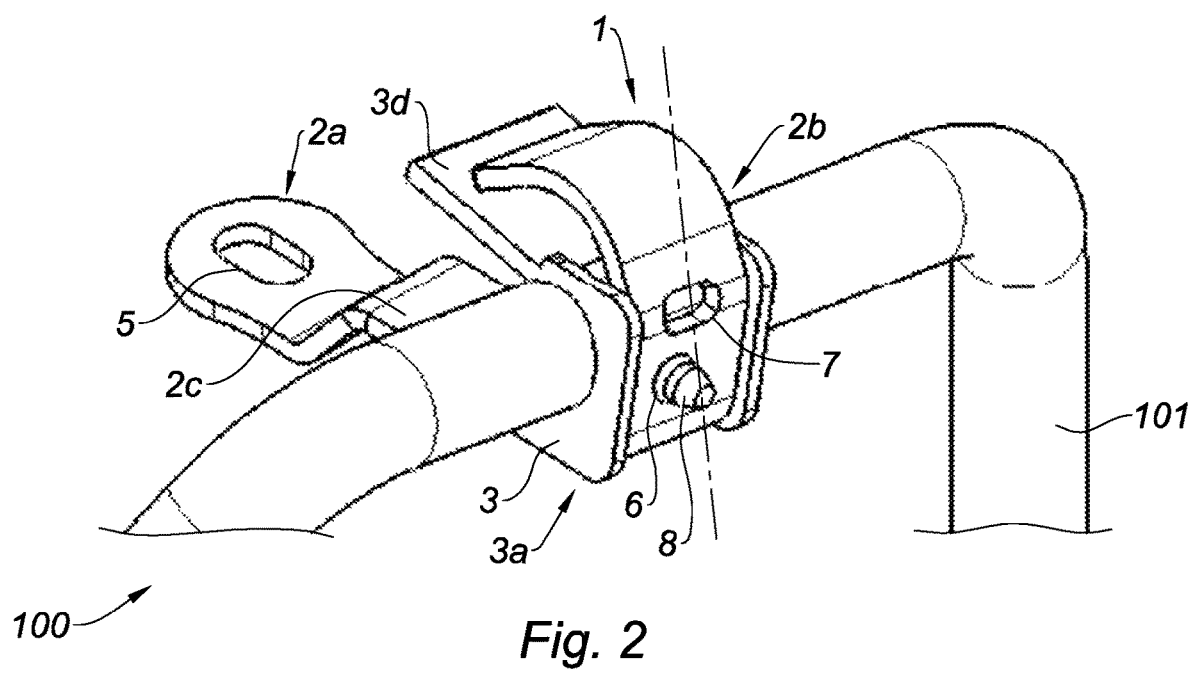
Figure 3:
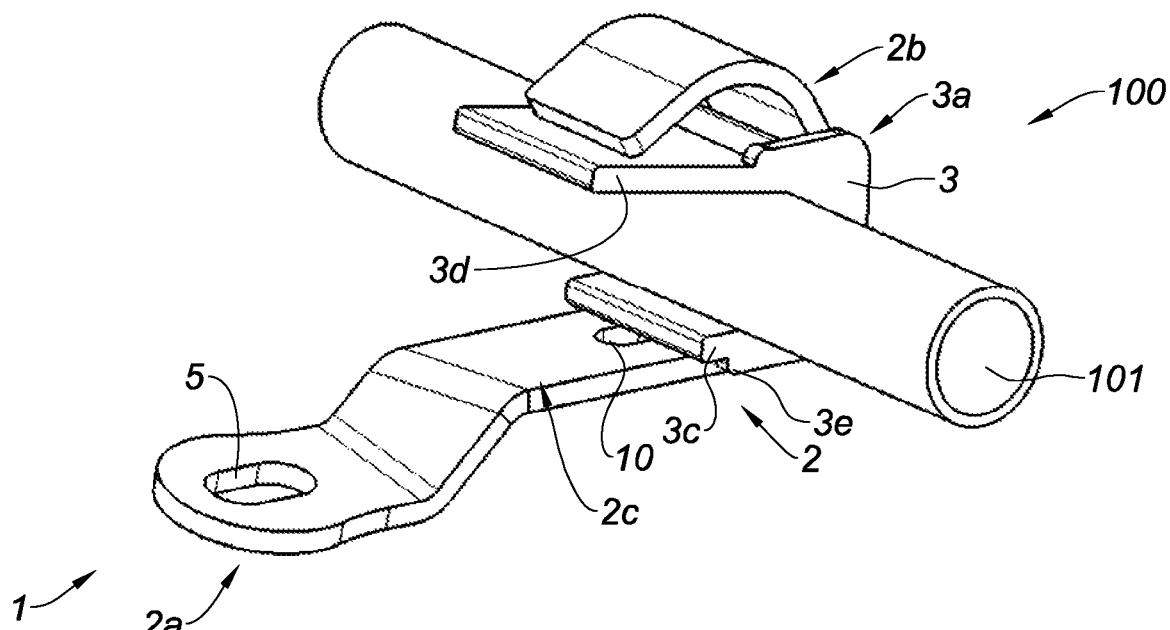
Figure 4:
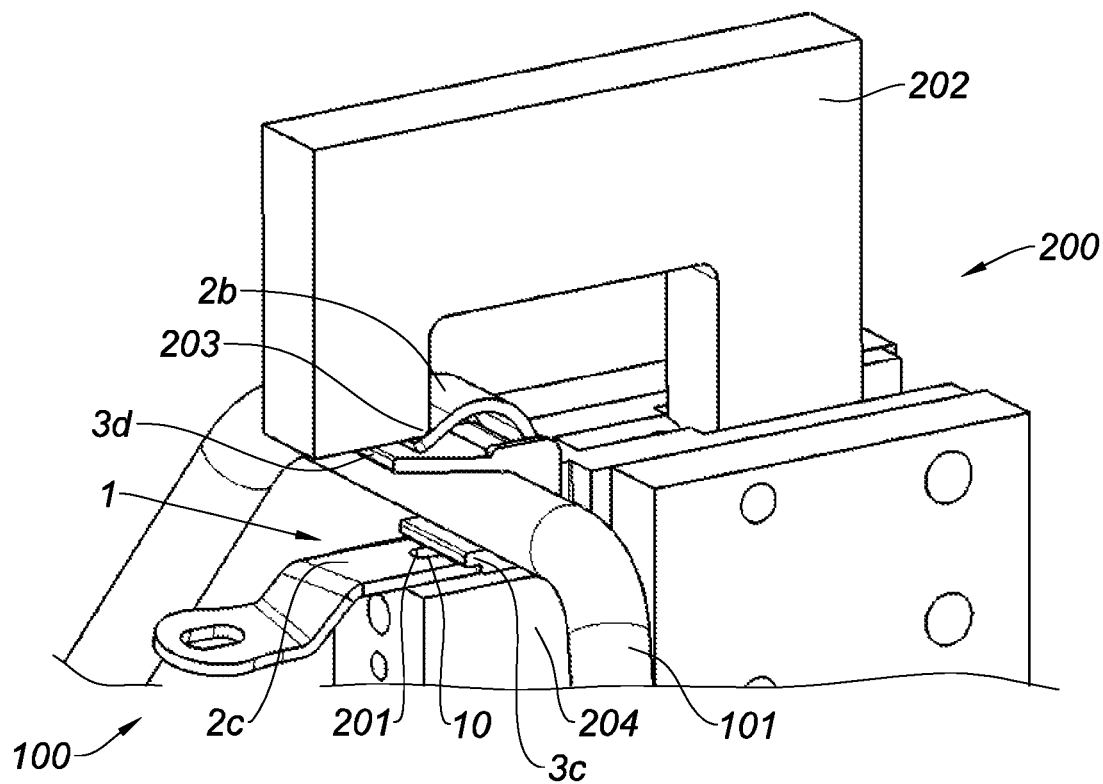

The invention will be better understood thanks to the detailed specification hereinafter, which describes embodiments of the invention as examples and based on the following figures:

FIG. 1 is a perspective view of the bracket according to the invention before assembly on a tubing element, FIG. 2 is a perspective rear view of the bracket according to the invention with a tubing element (before manufacturing process), FIG. 3 is a perspective front view of the bracket illustrated in FIG. 2 before clamping around the tubing element, FIG. 4 is a perspective view of the bracket assembly placed in a forming tool (steps b and c of the manufacturing process)

Figure 5:
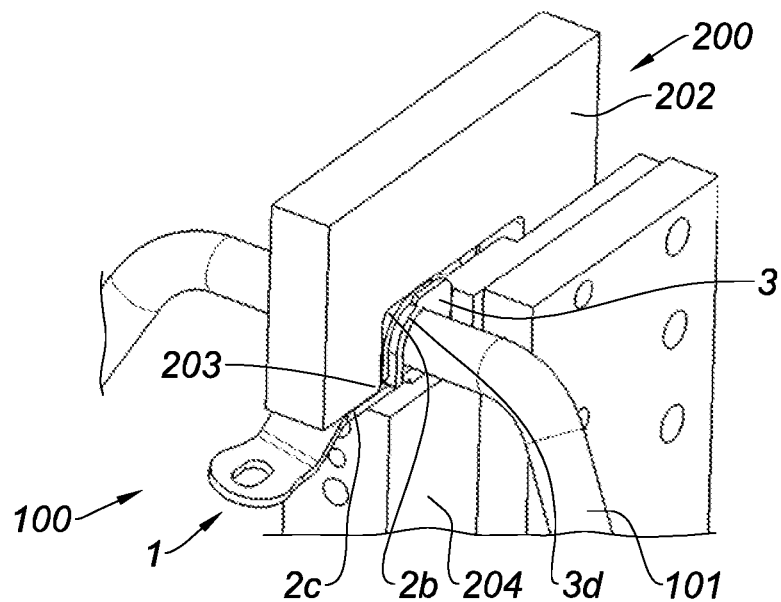
Figure 6:
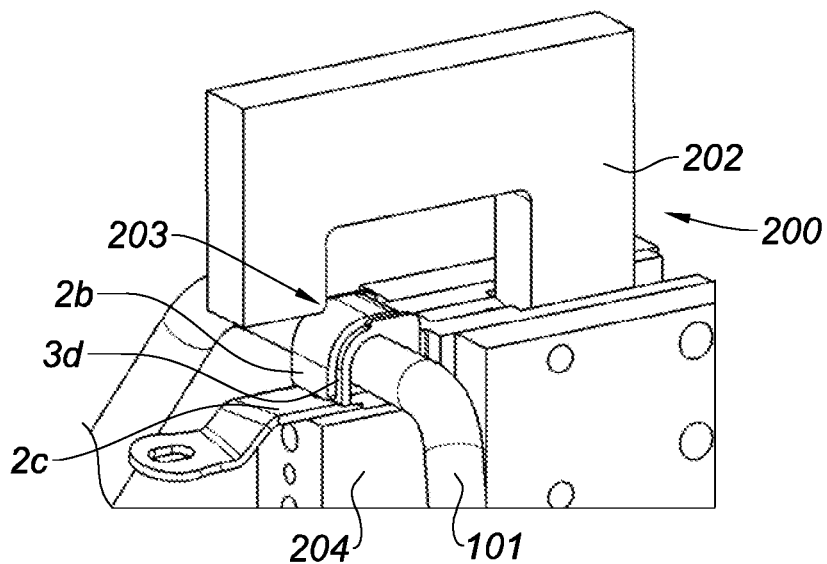
Figure 7:
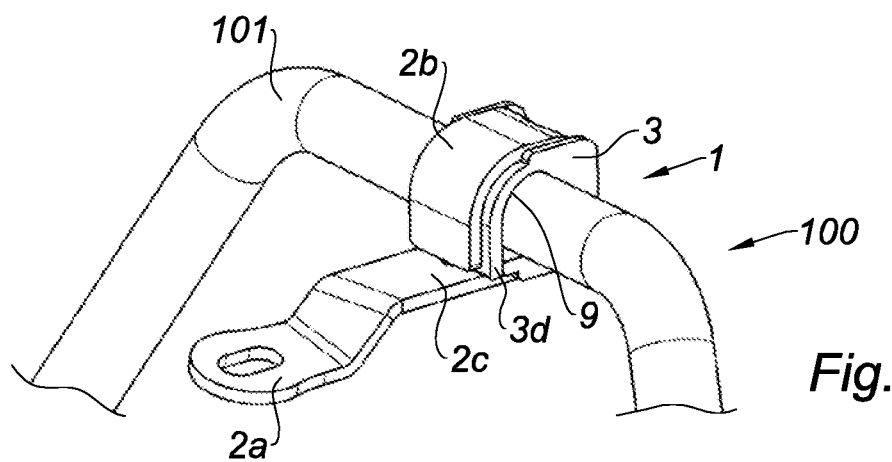

FIG. 5 is a perspective view of the bracket assembly during step (d) of the manufacturing process, FIG. 6 is a perspective view of the bracket assembly after step (d) of the manufacturing process, FIG. 7 is a perspective view of the bracket assembly according to the invention, with the tubing element in place and hold firmly by the retaining elasticity of the elastic insert.

The bracket 1 according to the invention is configured to be closed around a tubing element 101 by a forming tool 200 so as to form a bracket assembly 100. The bracket 1 comprises at least a body 2, preferentially a metallic body 2 as illustrated in FIG. 1. The body 2 comprises a first end 2a configured to be fastened to a support (not shown), such as a chassis or an engine of a vehicle, preferably a motor vehicle. As shown in FIG. 1, the first end 2a comprises one fastening interfaces, such as fastening hole 5. The body 2 further comprises a second end 2b opposite to the first end 2a. The second end 2b is bent so as to form a curved recess 4 oriented toward the first end 2a and facing an intermediate portion 2c of the body 2 arranged between the first end 2a and the second end 2b. As illustrated in FIG. 2, the second end 2b comprises a positioning opening 7 configured to define a bending position for final closing of the bracket 1.

As illustrated in FIGS. 1 to 3, the bracket 1 comprises an elastic insert 3 arranged in the recess 4 of the second end 2b. The elastic insert 3, comprises a first portion 3a forming a housing configured to house a part of the second end 2b. Advantageously, the housing of the first portion 3a is shaped to be adapted to the part of the second end 2b as illustrated in FIG. 2.

The elastic insert comprises at least one second portion 3b opposite to the first portion 3a, the second portion 3b being shaped like a curve forming a securing gap 9, as illustrated in FIG. 1. The second portion 3b comprises a first branch 3c and a second branch 3d arranged opposite to the first branch 3c, the first branch 3c and the second branch 3d being arranged to frame the curve/securing gap 9 formed by the second portion 3b of the elastic insert 3.

As it can be seen in FIG. 1, the first branch 3c is arranged so as to be in contact with a part of the intermediate portion 2c of the bracket's body 2. Moreover, the second branch 3d is extending globally parallel relative to the intermediate portion 2c. In a non-illustrated variant, the second branch 3d is arranged relative to the intermediate portion 2c of the bracket's body 2 in order to form an angle which allows the introduction of a tubing element 101.

and particularly, the second branch 3d is arranged under the second end's bending 4 and being overlapping said second end 2b. It is also noted that for the purpose of the invention and the manufacturing process, the second branch 3d is longer than the first branch 3c.

As illustrated in FIG. 2, the elastic insert 3 comprises a retaining tab 8 cooperating with a retaining opening 6 arranged on the second end 2b of the body 2 of the bracket 1. Advantageously, the positioning opening 7 of the second end 2b is arranged nearby the retaining opening 6. Furthermore, the retaining tab 8 is shaped to be retained on the back surface of the second end 2b of the body 2. The retaining tab 8 improves and secures the assembly of the elastic insert 3 with the bracket's body 2. As an example, the retaining tab 8 is shaped like a cone with barb or bulge retaining firm fixation like on fishing hook.

Moreover, the retaining tab 8 is positioned on the first portion 3a of the elastic insert 3 in a non-centered way or non symmetrical way to prevent the wrong positioning of the elastic insert 3 on the bracket's body 2. According to another feature of the invention, the second portion 3b of the elastic insert 3 comprises a bottom housing 3e shaped to house a part of the intermediate portion 2c of the bracket's body 2.

As it can be seen partially in FIG. 1, the bracket 1 comprises at least one additional hole 10 configured to cooperate with a pin or a mechanical device 201 (not shown in FIG. 4) arranged in a forming tool 200. The additional hole 10 allows securing and holding firmly at least the bracket 1 and preferably the bracket assembly 100 to the tool 200 during the manufacturing of said bracket assembly 100. Preferably, the additional hole 10 is oval. Advantageously, the additional hole 10 is arranged on the body 2 of the bracket and more particularly on the intermediate portion 2c of the body 2 as shown in FIGS. 1, 3 and 4.

The bracket 1 of the invention once manufactured (assembled) with a tubing element 101, forms a bracket assembly 100 which is illustrated in FIG. 7. The bracket assembly 100 is used for fixing in the vehicle a tubing element that constitutes a part of a fluid circuit, such as a cooling circuit, a braking circuit, a power-assisting circuit for a steering mechanism, a fuel supply circuit, an air supply circuit, a windscreen-washing circuit, etc. As it can be seen in FIG. 7, the tubing element 101 is housed in the securing gap 9 formed by the second portion 3b of the elastic insert 3 of the bracket 1. More particularly, the elastic insert 3 surrounds the tubing element 101 and the second end 2b of the bracket's body 2 grips the surrounding of the elastic insert 3 so as to close the housing where the tubing element 101 is housed.

The FIGS. 4 to 6 illustrate part of the manufacturing process according to the invention. The step (a) is not illustrated. The steps (b) and (c) are illustrated in FIG. 4. In these steps, the bracket 1 is placed (step (b)) within a forming tool 200 which comprises a U-shaped deforming clamp 202 and support 204 where the bracket 1 is positioned. The support 204 comprises a pin or a mechanical device 201 that cooperates with the additional hole 10 of the bracket 1. Moreover, the deforming clamp 202 comprises a deforming surface 203 intended to apply a clamping force on the second end 2b of the bracket's body 2 leading to the plastic deformation of the second end 2b and the deformation of the second branch 3d of the elastic insert 3 of the bracket 1. Then (step (c)), the tubing element 101 is placed in the securing gap 9 of the elastic insert 3 of the bracket 1. The FIG. 5 illustrates the step (d) consisting of actuating the forming tool 200 for plastically deforming the bracket 1 by linear or rotational movement so as to close the bent of the second end 2b of the bracket 1 around the tubing element 101 and to grip the tubing element 101, the elastic insert 3, more particularly, the second branch 3d of the elastic insert 3 being simultaneously bent in order to surround the tubing element 101. A shown in FIG. 5, the second branch 3d bent is extending substantially in a secant and preferably perpendicular manner relative to the intermediate portion 2c and/or to the first branch 3c.

The FIG. 6 illustrates the releasing of the forming tool 200 and the bracket assembly 100 obtained.

Obviously, the invention is not limited to the embodiments described and represented with the annexed figures. Modifications remain possible, in particular from the point of view of the constitution of the each element or by substitution of technical equivalents, without leaving for all that the scope of the invention.

The invention claimed is:

1. A bracket having at least a body comprising:
a first end configured to be fastened to a support,
a second end opposite to the first end,
an intermediate portion arranged between the first end and the second end,
the second end being bent so as to form a recess oriented toward the first end and facing the intermediate portion,
wherein the bracket further comprises an elastic insert arranged in the recess of the second end;
wherein the elastic insert comprises a first portion forming a housing configured to house a part of the second end of the bracket and at least one second portion opposite to the first portion, the second portion being curved forming a securing gap;
wherein the second portion of the elastic insert comprises a first straight branch and a second straight branch arranged opposite to the first straight branch, the first straight branch and the second straight branch being arranged to frame a curve securing gap formed by the second portion of the elastic insert;
wherein the first straight branch of the second portion of the elastic insert is arranged so as to be in contact with a part of the intermediate portion of the bracket's body and the second straight branch of the second portion of the elastic insert is extending parallel relative to the intermediate portion of the bracket's body;
wherein the second straight branch of the second portion of the elastic insert is arranged under the second end of the bracket's body, and is longer than the second end of the bracket's body and protrudes from said second end of the bracket's body; and
wherein the second straight branch of the second portion of the elastic insert is longer than the first straight branch of the second portion of the elastic insert.

2. The bracket according to claim 1, wherein the second end comprises at least one retaining opening cooperating with a retaining tab arranged on the elastic insert.

3. The bracket according to claim 1, wherein the second end comprises a positioning opening configured to define a bending position for final closing of the bracket.

4. The bracket according to claim 1, wherein the bracket comprises at least one additional hole configured to cooperate with a pin or a mechanical device arranged in a forming tool.

5. The bracket assembly comprising a bracket according to claim 1, and at least one tubing element.

6. The bracket assembly according to claim 5, wherein the tubing element is housed in the securing gap of the bracket.

7. A Manufacturing process for making a bracket assembly including a bracket and a tubing element, wherein said process comprising at least the following steps:
a. obtaining the bracket according to claim 1,
b. placing the bracket within a forming tool,
c. placing a tubing element within the bracket, in the securing gap arranged in the elastic insert, and
d. actuating the forming tool for plastically deforming the bracket by linear or rotational movement to close a bent of the second end of the bracket around the tubing element and to grip the tubing element, the elastic insert being simultaneously bent with the second end of the bracket's body in order to surround the tubing element until the second branch bent is extending substantially in a perpendicular manner relative to the intermediate portion and/or to the first branch of the second portion of the elastic insert.

8. The manufacturing process according to claim 7, wherein closing of the bent of the second end of the bracket's body, leads to bending of a portion of the elastic insert and a second straight branch of the portion of the elastic insert, so that the portion of the elastic insert surrounds the tubing element.

9. The manufacturing process according to claim 7, wherein the step (a) comprises sub-steps consisting of:
pre-bend the second end of the body of the bracket, and
pre-assemble the elastic insert on the body of the bracket, by inserting the retaining tab of the elastic insert in the retaining opening of the second end of the bracket's body.

10. A bracket having at least a body comprising:
a first end configured to be fastened to a support,
a second end opposite to the first end, an intermediate portion arranged between the first end and the second end, the second end being bent so as to form a recess oriented toward the first end and facing the intermediate portion, wherein the bracket further comprises an elastic insert arranged in the recess of the second end;

wherein the elastic insert comprises a first portion forming a housing configured to house a part of the second end of the bracket and at least one second portion opposite to the first portion, the second portion being curved forming a securing gap;

wherein the second portion of the elastic insert comprises a first straight branch and a second straight branch arranged opposite to the first straight branch, the first straight branch and the second straight branch being arranged to frame a curve securing gap formed by the second portion of the elastic insert;

wherein the first straight branch of the second portion of the elastic insert is arranged so as to be in contact with a part of the intermediate portion of the bracket's body and the second straight branch of the second portion of the elastic insert is arranged relative to the intermediate portion of the bracket's body in order to form an angle which allows the introduction of a tubing element;

wherein the second straight branch of the second portion of the elastic insert is arranged under the second end of the bracket's body, is longer than the second end of the bracket's body and protrudes from said second end of the bracket's body; and wherein the second straight branch of the second portion of the elastic insert is longer than the first straight branch of the second portion of the elastic insert.

* * * * *